United States Patent [19]

Bodge

[11] Patent Number: 4,471,660
[45] Date of Patent: Sep. 18, 1984

[54] PROCESS CONTROL INSTRUMENT USING A PNEUMATICALLY DRIVEN RESONANT ELEMENT

[75] Inventor: Philip K. Bodge, Andover, Mass.

[73] Assignee: The Foxboro Company, Foxboro, Mass.

[21] Appl. No.: 352,968

[22] Filed: Feb. 26, 1982

[51] Int. Cl.³ .......................... G01L 7/10; G01L 9/00
[52] U.S. Cl. ....................... 73/704; 73/651;
73/655; 73/705; 250/227
[58] Field of Search ............... 73/702, 704, 651, 653,
73/655, 515, DIG. 1, 705; 250/231 P, 227

[56] References Cited

U.S. PATENT DOCUMENTS

| 3,503,479 | 3/1970 | Canova | 73/521 |
| 3,505,880 | 4/1970 | Riordan | 73/702 |
| 3,557,660 | 1/1971 | Palmer | 73/521 |
| 3,581,579 | 6/1971 | Schmidlin | 73/515 |

Primary Examiner—Donald O. Woodiel
Attorney, Agent, or Firm—Ronald J. Paglierani; Jack H. Wu

[57] ABSTRACT

A process control instrument, in which the resonant frequency of a vibrating string varies in accordance with changes in a process parameter being monitored, employs a pneumatic drive system to induce the string into oscillation. Pressurized gas is discharged through a port, such as a jet nozzle, which is disposed to allow the gas to impinge on the outer surface of the string. Variations in the alignment between the gas discharge port and the string permits different modes of vibration, one of which is particularly suitable for process measurement purposes. In a particular embodiment of the apparatus, an optical sensor detects the frequency of vibrations, resulting in an intrinsically safe instrument for use in explosive environments.

12 Claims, 12 Drawing Figures

PROCESS CONTROL INSTRUMENT USING A PNEUMATICALLY DRIVEN RESONANT ELEMENT

BACKGROUND OF THE INVENTION

The present invention relates generally to the field of process control instruments employing vibratable elements with resonant frequencies that change in accordance with externally imposed influences, and more particularly to the drive mechanism for such instruments.

It is well known in the process control industry that accurate and effective sensors can be made for detecting changes in process variables such as the rate of fluid flow, pressure, temperature, etc., by making use of the oscillatory characteristics of a vibrating element such as a quartz crystal, a reed, a wire or a flat ribbon. In the case of the vibrating wire or ribbon, which can be described by the more general term "strings" (i.e., stretched elements fixed at both ends), vibration typically is induced by the electromagnetic interaction between a magnetic coil assembly and an electric current passing through the string. Examples of such electromagnetic schemes are shown in U.S. Pat. No. 4,165,651, and copending applications Ser. Nos. 155,325 and 161,123, which have the same assignee as the present application. Mechanical drive means also have been envisioned, such as the arrangements disclosed in copending patent application Ser. No. 365,678, filed Apr. 5, 1982. However, no resonant element process control instrument has been found in which the vibrating string is stimulated by means of an air discharge.

The classical wind-driven string instrument known as the Aeolian harp utilized the passage of air over an arrangement of strings to produce a musical tone. However, this interaction between the wind and the strings was more or less haphazard, and this principle is not known to have been applied in any systematic fashion to a commercially available industrial process control instrument. U.S. Pat. No. 4,257,010 does allude to the delivery of energy to a vibratable band by pneumatic means, but without any hint of a structure to accomplish that result.

One of the drawbacks of the magnetic coil assembly or other electrically-based drive systems is that electrical potentials generally are present within the vibrating element instrument itself. Often times the instrument is located in an atmosphere containing combustible or explosive gases, which can be ignited by electrically-generated sparks. Safety requirements impose stringent limits on voltage and current levels allowed. Such limits may hamper the operating efficiency of the instrument. Also, if a user of pneumatic process control instruments wishes to employ a vibrating element device, he may need to introduce electrical circuitry into a region where previously it was not required. Naturally this entails additional expense and inconvenience.

Therefore in light of the above considerations, it is an object of the present invention to provide a drive system for inducing oscillation of a vibratable string which eliminates the presence of electrical potentials at the site of the vibratable string. In addition, it should be easily adaptable to presently existing pneumatic control systems.

It is a further object of the present invention to provide such a drive system which is energy efficient, as well as being reliable and economical to install and maintain.

SUMMARY OF THE INVENTION

An embodiment of a vibratable element drive system in accordance with the present invention operates in the context of a measurement apparatus in which the resonant frequency of a mechanically vibratable element varies in accordance with changes in the physical parameter being measured. It comprises a source of pressurized gas and a gas discharge port in fluid communication with the source of pressurized gas. The gas discharge port is disposed so as to direct a stream of the gas onto an outer surface of the vibratable element, whereby energy is transferred to induce the element to vibrate at its resonant frequency. In its most common form, the pressurized gas used is air, though any other source of instrument-grade gas, such as dry nitrogen, can be used.

In a particular embodiment a uniquely configured nozzle, which functions as a pneumatic analog to the escape mechanism of a pendulum clock, provides a periodic impulse to the wire in a particularly efficient manner to maintain the string in vibration. The physical dimensions of the nozzle determine the time constant of the system and can be selected to permit the nozzle to drive strings having a wide range of resonant frequencies.

Because of the inherent intrinsic safety aspects of a pneumatic drive system, a process control instrument employing such a system can be combined with an optical sensing apparatus to provide a total system which is intrinsically safe, and which additionally is unaffected by stray electromagnetic interference or nuclear radiation effects.

BRIEF DESCRIPTION OF THE DRAWINGS

The novel aspects and distinct advantages of the present invention will be made clear by the following detailed description, in conjunction with the accompanying drawings, in which:

FIGS. 4A-6A are detail views, similar to that of FIG. 2, showing alternate arrangements of the vibrating string and the nozzle;

FIGS. 4B-6B are side views, similar to that of FIG. 3, of the respective arrangements of FIGS. 4A-6A;

DESCRIPTION OF THE PREFERRED EMBODIMENT

Figure 1:
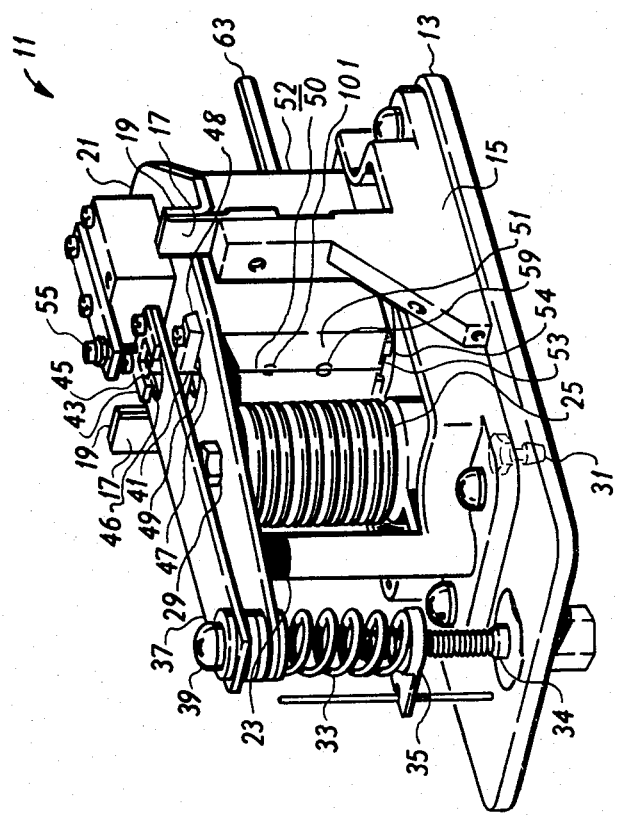
FIG. 1 is a perspective view of a pneumatically driven instrument in accordance with the present invention.

In FIG. 1 a process control instrument 11 includes a horizontal base plate 13 which serves as the foundation for the mounting of the rest of the components. Each of two vertical support arms 15 is secured rigidly to the base plate and has attached to its upper end a thin, flexible tab 17. Each tab in turn is bonded to one of a pair of vertical sections 19 projecting upwardly from either side of a horizontally aligned bracket 21. Flexing of the two tabs permits the bracket to pivot vertically about the arms 15. An upwardly projecting mechanical stop 23, also rigidly mounted on the base plate, is positioned beneath the bracket and limits its downward travel.

A bellows assembly 25 is disposed between the base plate 13 and the bracket 21. The top of the bellows assembly is secured to the bracket by a nut 29, whereby the bracket is constrained to move upwardly and downwardly in conjunction with movement of the bellows. An air inlet line 31 passes through the base plate and communicates with the hollow interior of the bellows. This line connects at its opposite end to an external source of variable pressure (not shown) which pressure is either the physical parameter being measured or is directly correlated to another variable physical parameter being measured. As this pressure varies, the internal pressure within the bellows varies accordingly, causing the bellows to expand or contract, and forcing the horizontal bracket to pivot upwardly or downwardly. A spring 33 positioned between the underside of the bracket and an adjustable stop 35 maintains an upward bias force against the bracket. Altering the position of the stop, by turning a screw 34 threaded into the stop, either extends or compresses the spring, and changes the upward force.

A tension arm 37, a rectangular-shaped piece of spring-like material, is fastened at one end to the bracket 21 by a screw 39, and extends generally parallel to the bracket, but is detached at its opposite end from the bracket itself. Extending downwardly from the tension arm is a resilient ribbon 41 which is secured to the tension arm by means of a clamp 43. The ribbon passes over a positioning rod 45, downwardly through an opening 46 in the tension arm, contacts a bevelled edge 47 of a transverse bar 48, passes through an opening 49 in the bracket, and continues through a vertical slot 50 cut into a face 51 of a mounting block 52 (see also FIG. 2). At its bottom end the ribbon passes over a second rod 53 and is fastened to the underside of the block by a clamp 54. The ribbon is under tension because of the upward bias of the bracket-and-tension arm combination, under the influence of the spring 33. Clearly as the tension arm moves upwardly or downwardly with the bracket, under influence of signal pressure in the bellows, the tension applied to the ribbon varies accordingly.

The maximum tension applied to the ribbon is limited by a pre-set tension in the arm 37 which serves as an overrange protection device. When both ends of the ribbon have been suitably clamped, the initial ribbon tension, and therefore its initial frequency, is set by applying a bias pressure (typically 3 psig) to the bellows 25 and adjusting the spring 33 and a stop screw 55. When the pneumatic signal pressure within the bellows is increased, tension of the ribbon is increased accordingly. If excessive pressure is applied inadvertently to this bellows, the ribbon tension increases until the tension arm 37 no longer applies any force against the stop screw. Beyond this point the tension arm actually separates from the top screw, and the ribbon tension is limited to a safe value determined by the spring rate of the tension arm.

Although the descriptive term "ribbon" has been used, the ribbon 41 can be replaced by any element which satisfies the more generic description "string", by which is meant any thin, elongate element, regardless of its cross section, fixed at both ends and under tension, which can vibrate transversely with respect to its ends.

Figure 2:
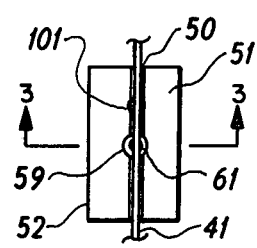
FIG. 2 is a detail view showing the positional relationship between the nozzle and the vibrating string of the instrument shown in FIG. 1.
Figure 3:
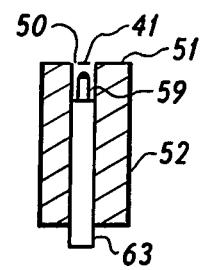
FIG. 3 is a side view of the structure of FIG. 2, taken along the line 3—3.

As shown more clearly in FIGS. 2 and 3, the plane of the ribbon 41 is parallel to the plane of the vertical face 51 of the mounting block 52. A nozzle 59 is seated within the mounting block with its outlet port 61 positioned immediately behind the vibratable ribbon. Air or other suitable gas is supplied to the nozzle from an external pressurized source (not shown) by means of a line 63 passing through the block. The air may be discharged from the nozzle in either a continuous or a pulsed mode. When air is discharged past the ribbon, the ribbon vibrates at its natural resonant frequency due to aerodynamic interaction with the stream of air. The nozzle is positioned behind the ribbon just far enough so as not to be struck by the ribbon as it vibrates to either side of its equilibrium position. Typically the air pressures used are in the range of 3–20 psig, the commercially accepted standard range of pressures for pneumatic instrumentation, although others can be used.

As is well known in the prior art, the resonant frequency of the ribbon is a function of the applied tension. Therefore as the tension changes in accordance with the upward or downward movement of the tension arm 37, the resonant frequency of the ribbon changes. The length of ribbon which actually vibrates is determined by the distance between the edge 48 of the transverse bar 49 and the lower rod 53. The edge 48 functions in the manner of a bridge on a guitar or other stringed instrument.

Although in the embodiment of FIGS. 1 and 2 the air is supplied to the ribbon by a jet nozzle, other commonly available devices for delivering a flow of air, such as a simple orifice or a capillary tube, may be used. An important consideration is that a high-velocity fluid stream, having sufficient energy to induce vibration, be incident on the ribbon.

Figure 4A:
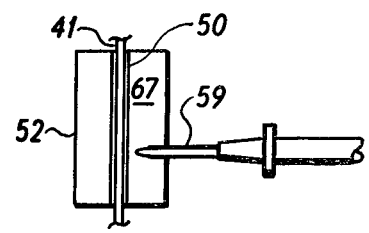
Figure 4B:
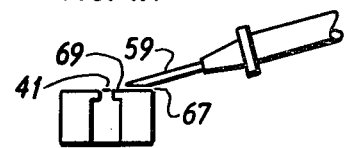

In the embodiment of FIGS. 1 and 2, the nozzle 59 is shown as being aligned perpendicularly to the flat surface of the ribbon 41. However, experimentation has shown that other configurations are also successful in stimulating the ribbon into vibration. FIGS. 4A–6A and 4B–6B are representative of such variations, and the same reference numerals as in FIGS. 1 and 2 are repeated to indicated corresponding elements. In FIGS. 4A and 4B the ribbon is similarly oriented within the slot 50 in the mounting block 52. However, the nozzle is not situated behind the ribbon, nor does it direct its air stream directly onto its flat surface. Rather, the nozzle is at an oblique angle relative to a surface 67 of the block, and the air jet emitted from the nozzle travels across this surface and past the ribbon and slot. It has been found for these alternate configurations that the mode of vibration of the ribbon is determined by the relative position of the ribbon with respect to a top edge 69 of the slot. If the plane of the ribbon is flush with or below the level of this edge, the ribbon is excited into a Rayleigh mode of excitation, which is the common transverse vibrational mode typical of a vibrating string. However, if the plane of the ribbon is above the height of the edge, a torsional, or twisting, mode occurs. The resonant frequencies of these two modes are not necessarily the same, however. In FIGS. 3 and 4B–6B the plane of the ribbon is shown as being at the height of the edge, indicating that the Rayleigh mode of vibration is intended.

Advantages of the Rayleigh mode are that the amplitude of vibration is more nearly constant over a range of frequencies, and the resonant frequencies are more suitable to the conventional electronic circuitry used with previous vibrating element devices.

Figure 5A:
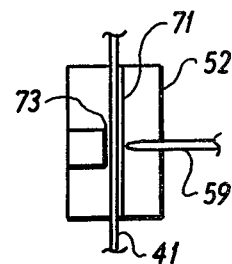
Figure 5B:
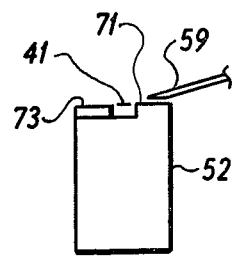
Figure 6A:
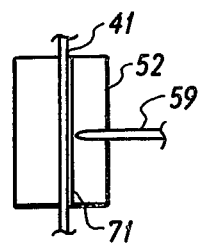
Figure 6B:
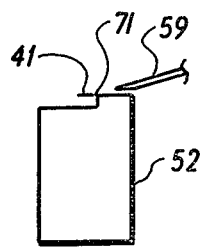

In FIG. 5A, a modified block 52 is depicted. A first slot-defining shoulder 71 extends on the right-hand side along the full height of the block, whereas on the left-hand side only a short slot-defining shoulder 73 is present. Note, however, that the nozzle 59 is positioned directly opposite this short shoulder section, so that the jet of air interacts with the ribbon within the slot formed between the right-hand and left-hand shoulders. In FIGS. 6A and 6B, there is no slot, but rather a stepped arrangement, in which the ribbon is positioned level with the shoulder 71.

Figure 7:
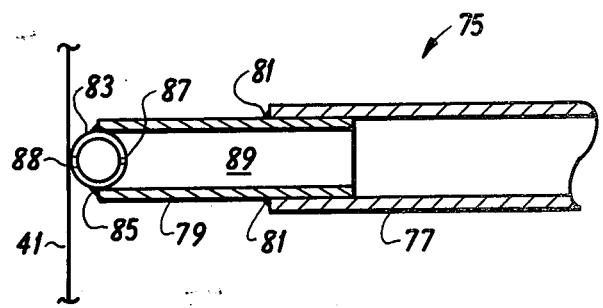
FIG. 7 is a detail view, in section, of an impulse nozzle usable in the instrument of FIG. 1.

A particularly efficient device for directing air onto the vibrating ribbon, particularly in the orientation of FIGS. 1 and 2, is shown in FIG. 7. The device 75, which can be described by the term "impulse nozzle", includes an outer section of tubing 77 which communicates with the pressurized source of gas or air (not shown), and a similar diameter inner section of tubing 79 tightly held within the outer section, and fixed thereto by a weld 81. A hollow, spherically-shaped vessel 83 is located at the external mouth of the inner section of tubing, and is held in place by a weld 85 or other suitable bonding means. Although this vessel is shown as being spherical in shape, enclosures having other shapes and defining an internal volume can be used. An inlet orifice 87 and an outlet orifice 88 are disposed in the outer wall of the vessel, the diameter of the inlet orifice being smaller than that of the outlet orifice.

Supply air pressure is maintained in a region 89 to the right of the inlet orifice 87, so that the pressure within the spherical vessel approaches ambient pressure, provided that the vibrating ribbon 41 has not approached the outlet orifice sufficiently close to throttle the flow of air emanating from it. However, as the ribbon approaches the nozzle, it begins to lessen the flow of air from the outlet orifice, and at its point of closest approach the exiting flow rate becomes small compared to the flow rate into the inlet orifice. This results in a sharp rise in pressure within the vessel, provided that the recovery time of the impulse nozzle, as measured by its time constant (a function of the sizes of the orifices and the volume of the enclosure), is less than or equal to the period of the natural fundamental frequency of the vibrating ribbon. Particularly efficient operation of the nozzle, especially in terms of limited air usage and optimum energy transfer, has been observed when the nozzle time constant is less than or equal to approximately one-quarter of this period. Since the natural frequency of the ribbon changes with the applied tension, the nozzle time constant must be gauged with respect to the period of the highest natural frequency within the variable range.

As the ribbon 41 moves away from the nozzle 59, the pressure within the spherical vessel 83 rapidly drops again to near ambient. Thus the impulse nozzle functions much in the manner of a pneumatic analog to the escape mechanism of a pendulum clock, in that it applies a short duration pneumatic impulse at the proper time to the vibrating ribbon, to replace the energy lost to friction and thus sustain oscillation. The above-mentioned limitation as to the time constant of the impulse nozzle is analagous to that imposed on the time constant of the mechanical escapement. This limitation insures that the nozzle builds up the requisite pressure in the time between successive cycles of the vibrating ribbon.

The time constant $\tau$ is given by the familiar formula $\tau = RC$, where R is a measure of the resistance to air flow, which is a function of the diameter of the inlet orifice 87, and C represents the storage capacity of the nozzle, a function of the volume of the vessel 83. Determination of such time constants is well known to one skilled in the pneumatic arts. Once the range of resonant frequencies of a particular vibratable ribbon has been identified, R and C are selected to yield the appropriate time constant and flow rate necessary for reliable operation.

The following calculations, based on a representative impulse nozzle configuration, illustrate the efficiency of such a device. This example is offered solely for illustrative purposes, and should not be interpreted in any limiting sense. The ribbon, measuring approximately 0.001 inch thick by 0.020 inch wide by 1.0 inch in length, is configured to have a maximum resonant frequency of 5,000 Hertz, and therefore a period of 0.0002 seconds. The time constant of the nozzle should be not greater than one-fourth of this period, i.e., $\tau = RC = 0.00005$ second, and R and C must be chosen accordingly. For a supply pressure P of 10 psig, a supply flow rate F of 0.278 cubic inch/second, and an inlet orifice 87 of 0.006 inch diameter, $$R = \frac{P}{F} = \frac{10 \text{ lb/in}^2}{0.278 \text{ in}^3/\text{sec}} = 36 \frac{\text{lb-sec}}{\text{in}^5}$$

Accordingly, $$C = \frac{\tau}{R} = \frac{0.00005}{36} \frac{\text{in}^5\text{-sec}}{\text{lb-sec}}$$

The volume $V_o$ of the vessel is determined from C according to the formula $C = V_o/P$. Thus $$V_o = PC = \left(10 \frac{\text{lb}}{\text{in}^2}\right) \times \left(\frac{0.00005}{36} \frac{\text{in}^5\text{-sec}}{\text{lb-sec}}\right)$$

$$= 0.000014 \text{ in}^3, \text{ which equates to a radius of 0.015 inch.}$$

This nozzle, when positioned relative to the ribbon in the manner depicted in FIGS. 1 and 2, causes the ribbon to vibrate in its fundamental Rayleigh mode, with a double amplitude swing of approximately 0.002 inch. This oscillation is achieved with an air flow rate, as mentioned above, of only 0.278 in³/sec, which comes to a little more than one-half standard cubic foot per hour. This extremely low flow rate represents a highly efficient energy consumption, and would present minimal demands on a typical pneumatic system. In fact, in case of a failure to the main air supply, it is conceivable that the ribbon could continue to be driven for a considerable time with a back-up supply in the form of a portable pressurized gas bottle.

Figure 8:
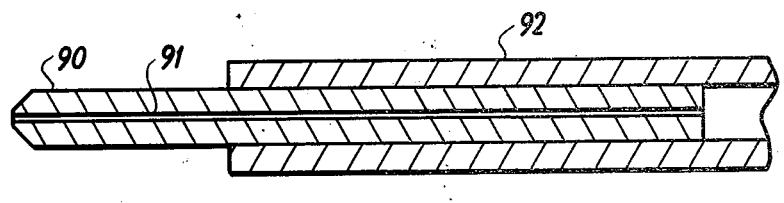
FIG. 8 is a detail view, in section, of an alternate impulse nozzle configuration.

FIG. 8 depicts an alternative construction of an impulse nozzle, one whose time constant is determined by slightly different factors. A length of capillary tubing 90 with a small central bore 91 is held tightly within an outer section of tubing 92, the outer section being in fluid comunication with the source of pressurized air (not shown). Whereas in the nozzle of FIG. 7 the time constant $\tau$ is a function of R and C, in this version $\tau = L/R$, where L is a measure of the inertance of the system, as determined by the inertia of an air column within the bore of the capillary, and R is not only a function of the diameter of the capillary bore but of its length as well. Similar to the previous case, R and L must be set to yield the appropriate time constant, in view of the resonant frequency of the ribbon. An advantage of either version of the impulse nozzle is that it concentrates the total energy available in the flow stream and releases it at the appropriate time. Therefore the impulse nozzle is more efficient in its air usage than the conventional jet nozzle with its continuous high velocity air stream.

Figure 9:
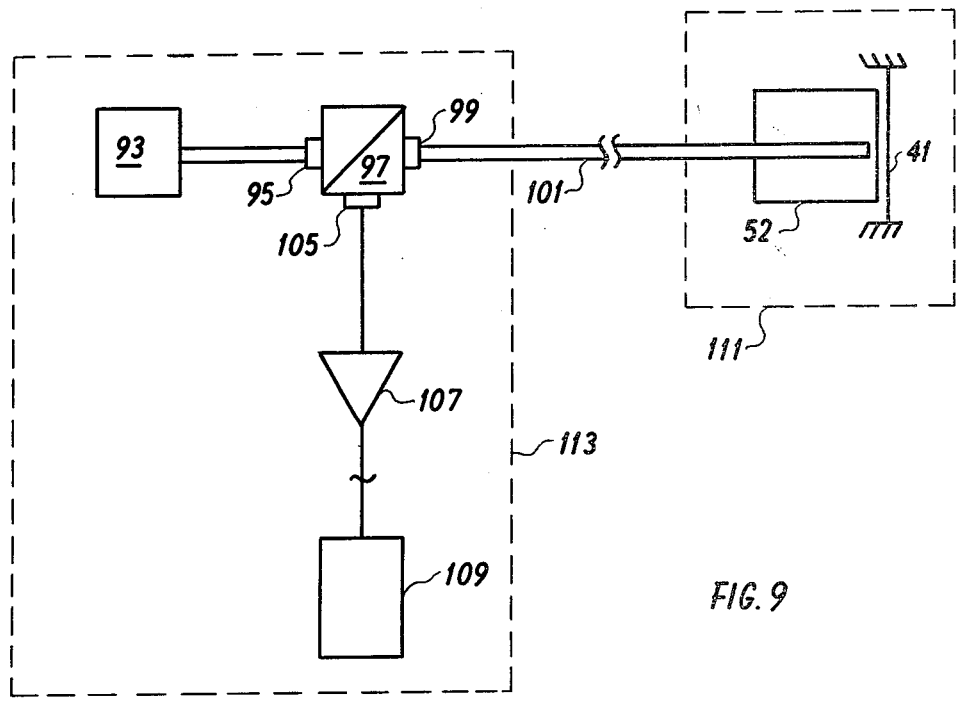
FIG. 9 is a block diagram of an optical detection system usable with the instrument of FIG. 1.

Since it is well known that the resonant frequency of the ribbon or other vibrating string varies in accordance with its tension and in turn in accordance with the changes in the physical parameter being measured (as communicated through the bellows assembly 25 [see FIG. 1]), the frequency of vibration has to be detected, so that a correlation to the ultimate parameter being measured can be made. Although any one of a variety of conventional detecting schemes can be used advantageously, a particularly useful scheme is an optical system similar to that disclosed in a copending patent application, Ser. No. 350,687, filed Feb. 22, 1982, having the same assignee as the present application. Referring to FIG. 9, the optical detection system operates as follows. A power supply 93 provides voltage to a light-emitting diode (LED) 95, to generate a beam of light incident on a beamsplitter 97. The light emitted by the LED can be generated in either a continuous or a pulsed fashion, whichever is suitable to the application. The beamsplitter is designed so that for light incident from the left-hand direction, some of the light is transmitted straight through into a lens 99, and some is reflected upwardly. The lens concentrates the transmitted light into an attached optical fiber 101, the end of which is fixed within the mounting block 52 (see also FIG. 1), adjacent the ribbon 41. The light is directed by the probe onto the rapidly vibrating ribbon.

As the ribbon alternately moves toward, and then away from, the fiber 101, the intensity of the light reflected by the outer surface of the ribbon back into the fiber varies periodically, at the same rate as the ribbon's frequency of vibration. The outer surface of the ribbon can be coated with an optically reflective material to enhance the amount of reflection. This intensity-modulated reflected light travels back along the same optical fiber 101 to the beamsplitter 97, where a portion of the light is reflected into a photodetector 105. The photodetector converts the variable intensity light beam into an electrical signal whose level varies at the same frequency. The electrical output from the photodetector is amplified by an amplifier 107 and is fed into a conventional electronic circuit 109, which correlates the frequency signal to the magnitude of the process parameter being measured. The output of this circuit can be used to operate a display or be further processed to serve other process control functions.

An advantage of combining the optical detection scheme with the pneumatic drive mechanism is the inherent intrinsic safety of the combination. Only passive, non-spark producing components such as the optical fiber 101, the vibrating ribbon 41 and the pneumatic nozzle 59, need be located within the process environment being monitored (indicated schematically by the dotted line 111), should the environment contain an explosive atmosphere. The electrical and electronic control circuitry, on the other hand, is located at a remote control station 113, separated from the explosive environment by thousands of feet, yet actively communicating with the distant components via safe light signals.

Although the present invention has been described in terms of the preferred embodiment shown in the accompanying figures, certain modifications and changes will become apparent to those skilled in the art. For example, modifications in the mounting of the vibrating ribbon, in the physical relationship between the ribbon and the driving nozzle, or in the structure of the ribbon itself may be envisioned, as well as alternate schemes for detecting the frequency of oscillation, whether by optical or non-optical means. Nevertheless it is intended that such modifications be encompassed within the scope of the following appended claims.

What is claimed is:

1. Apparatus for measuring the magnitude of a physical parameter, comprising:
   a mechanically vibratable element, the resonant frequency of which changes in accordance with changes in a physical characteristic of said element;
   means responsive to the changes in said physical parameter for effecting corresponding changes in said physical characteristic; and
   a drive system for said vibratable element, including:
      a source of pressurized gas,
      a gas discharge means in fluid communication with said source of pressurized gas for producing a jet of said gas, and
      means disposed intermediate said gas discharge means and said vibratable element for deflecting said gas jet onto said vibratable element, whereby energy is transferred to induce said element to vibrate at its resonant frequency.

2. Apparatus as set forth in claim 1, wherein said vibratable element is a taut wire.

3. Apparatus as set forth in claim 1, wherein said vibratable element is a taut ribbon.

4. Apparatus as set forth in claim 1, wherein said gas discharge means is a jet nozzle.

5. Apparatus as set forth in claim 1, wherein said gas discharge means is an orifice.

6. Apparatus as set forth in claim 1, wherein said gas discharge means is a capillary tube.

7. Apparatus for measuring the magnitude of a physical parameter, comprising:
   a mechanically vibratable element, the resonant frequency of which changes in accordance with changes in a physical characteristic of said element;
   means responsive to the changes in said physical parameter for effecting corresponding changes in said physical characteristic; and
   a drive system for said vibratable element, including:
      a source of pressurized gas,
      a gas discharge means in fluid communication with said source of pressurized gas, said gas discharge means being disposed so as to direct said gas onto said vibratable element, and
      means associated with said gas discharge means for causing periodic impulses of said gas to be discharged from said gas discharge means, whereby energy is transferred to induce said element to vibrate at its resonant frequency.

8. The drive system as set forth in claim 7, wherein the time constant of said gas discharge means is less than or equal to approximately one-quarter of the period of the natural fundamental frequency of said element.

9. The drive system as set forth in claim 8, wherein said gas discharge means further comprises:
- an outer conduit, a first end of which is in fluid communication with said source of pressurized gas;
- an inner conduit tightly held within the opposite end of said outer conduit, and projecting outwardly therefrom;
- a hollow, enclosed vessel disposed at the mouth of the outwardly projecting end of said inner conduit, said vessel having within its outer surface both an inlet orifice in communication with the interior of said inner conduit and an oppositely directed outlet orifice disposed adjacent said ribbon, said outlet orifice being periodically obstructed by the approach of said ribbon; and
- the time constant of said gas discharge means being determined by the interior volume of said vessel and the size of said inlet orifice.

10. A process control apparatus for developing a frequency signal in response to a change in a monitored process parameter, comprising:
- a mechanically resonant element, the resonant frequency of said element being dependent on the tension thereon;
- means for varying the tension on said mechanically resonant element in accordance with changes in said process parameter;
- a source of pressurized gas;
- a gas discharge means in fluid communication with said source of pressurized gas, said gas discharge means being disposed so as to direct a stream of gas onto said vibratable element, whereby energy is transferred to induce said element to vibrate at its resonant frequency; and
- optical means for detecting the resonant frequency of vibration of said resonant element.

11. The process control apparatus as set forth in claim 10 wherein said mechanically resonant element comprises a taut ribbon having an optionally reflective outer surface.

12. The process control apparatus as set forth in claim 11, wherein said optical means for detecting comprises:
- a source of light;
- optical conduit means for both transmitting said light from said source onto said reflective outer surface of said ribbon, and for receiving light reflected from said reflective outer surface, the intensity of said reflected light varying periodically at the resonant frequency of vibration of said ribbon.

* * * * *